May 15, 1962 N. G. BELL 3,034,591
AUTO TRACK LAYING AND AMPHIBIOUS VEHICLES
Filed May 26, 1958 3 Sheets-Sheet 1
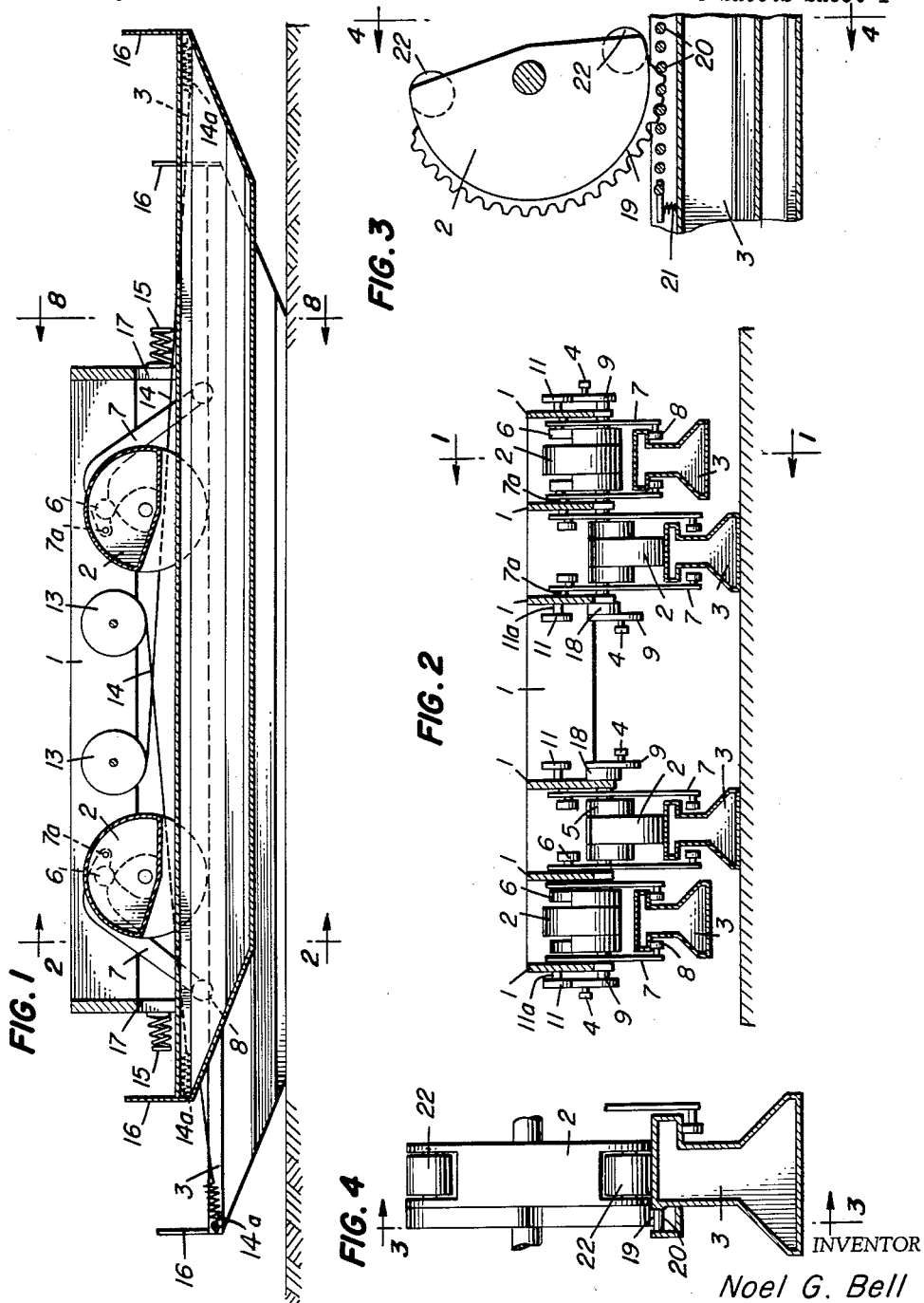
INVENTOR
Noel G. Bell
BY B. P. Fishburne, Jr.
ATTORNEY

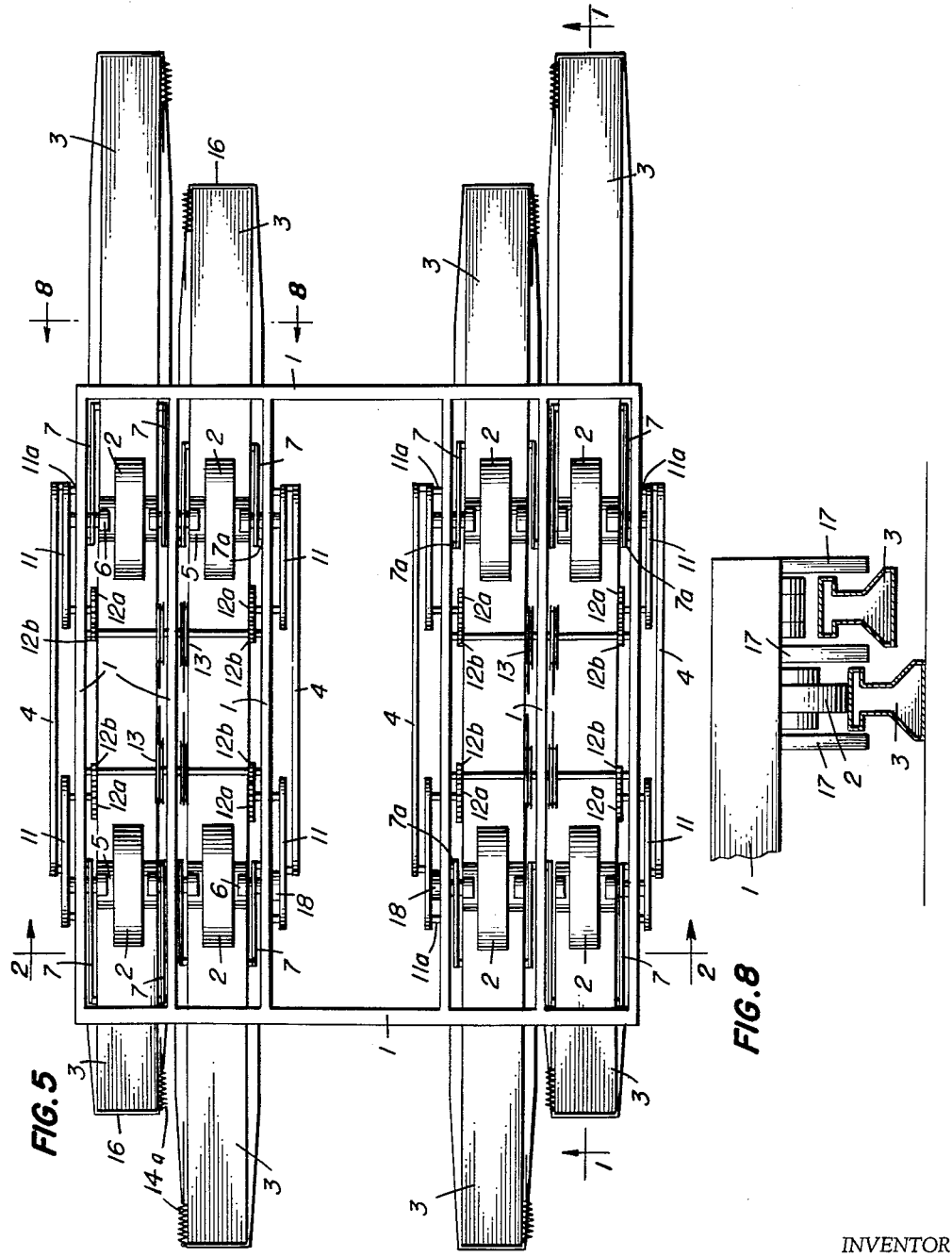

May 15, 1962 N. G. BELL 3,034,591
AUTO TRACK LAYING AND AMPHIBIOUS VEHICLES
Filed May 26, 1958 3 Sheets-Sheet 3
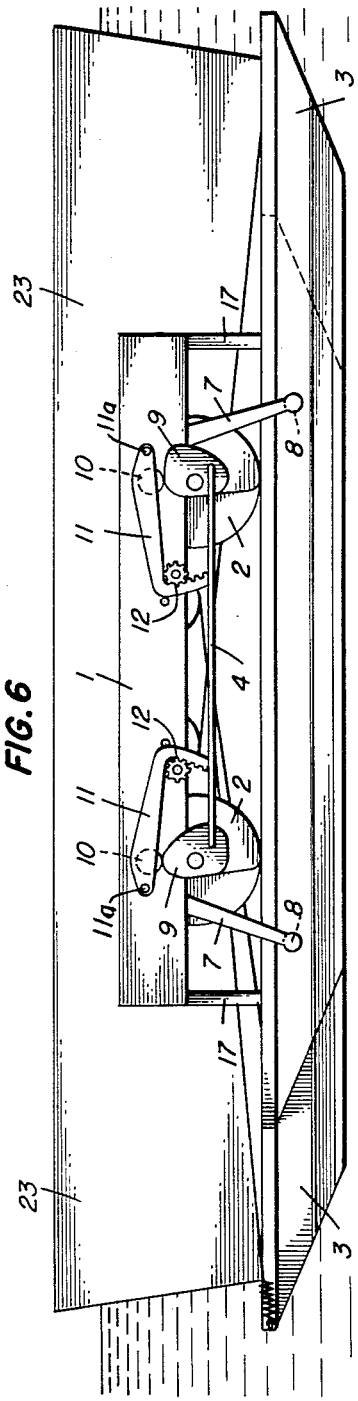
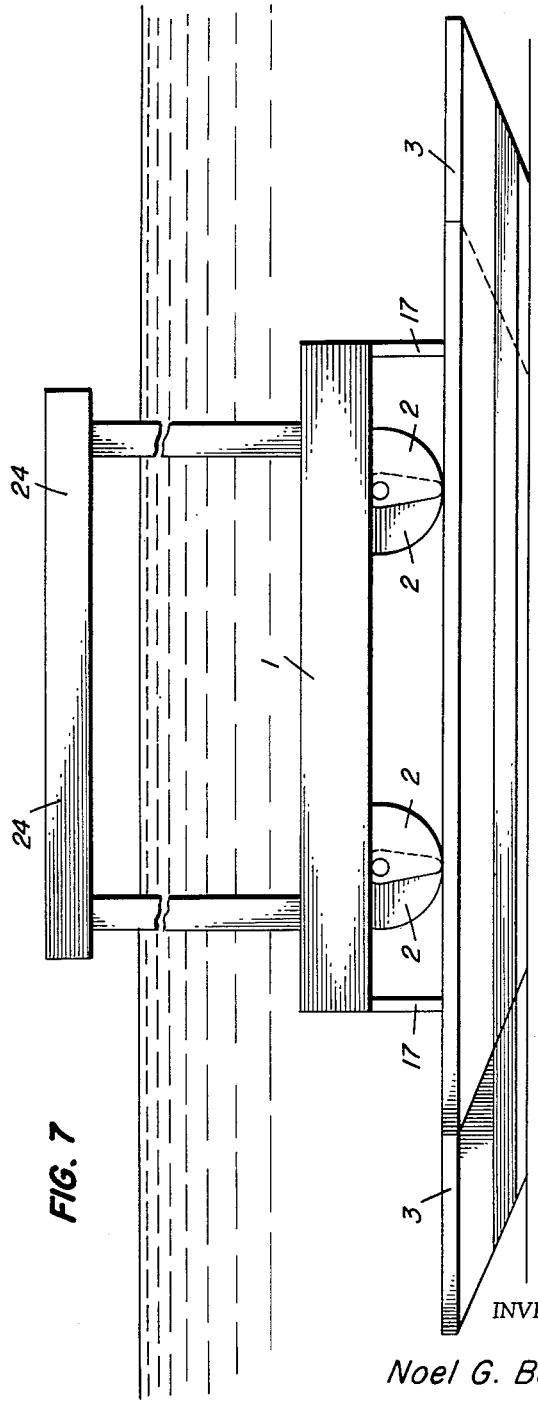
INVENTOR
Noel G. Bell
BY
ATTORNEY Patented May 15, 1962

3,034,591
AUTO TRACK LAYING AND AMPHIBIOUS
VEHICLES
Noel Gonne Bell, 510 Lincoln Blvd., Santa Monica, Calif.
Filed May 26, 1958, Ser. No. 737,553
5 Claims. (Cl. 180—8)

This invention refers to auto track laying and amphibious vehicles.

The invention provides a vehicle of the type that has pairs of wheel segments which roll on ground bearing track beams, the wheel segments being not less than a semi-circle, and each pair being mounted at opposite angular positions to each other so that while one wheel segment is rolling on a track beam the opposite wheel segment is out of contact with its track beam and allows the latter to be raised and moved forward for the vehicle to roll forward on it in turn, characterized in that:

(1) The ground bearing track beams are made of hollow construction so as to add to the buoyancy of the vehicle when used as an amphibious vehicle.

(2) The track beams are raised by means of cams, levers and rollers.

(3) The track beams are moved forward by means of cams, levers, rollers and gears.

(4) Sprocket wheels are mounted on the wheel segments and engage racks on the track beams, the racks being supported on springs.

Some embodiments of the invention are described as follows.

FIG. 1 is a longitudinal section of a vehicle in the plane 1—1 of FIGS. 2 and 5.

FIG. 2 is a cross section in the plane 2—2 of FIGS. 1 and 5.

FIG. 3 is an enlarged view of a detail in the plane 3—3 of FIG. 4.

FIG. 4 is an enlarged view of the detail in the plane 4—4 of FIG. 3.

FIG. 5 is a plan of the vehicle in FIGS. 1 and 2.

FIG. 6 is a side elevation of a vehicle similar to that shown in FIGS. 1, 2 and 5, but with the track beams in a different position and the hull of a boat mounted on the frame.

FIG. 7 is a side elevation of a vehicle similar to that shown in FIG. 6, but with a platform on the frame substituted for the hull of a boat, and having the means for raising and moving the tracks omitted.

FIG. 8 is a sectional view taken along line 8—8 of FIG. 1.

As shown in FIGS. 1, 2 and 5, a vehicle comprises a frame 1 with two pairs of wheel segments or half wheels 2 (hereinafter referred to as half wheels) and one pair of ground bearing track beams, buoyant pontoon track members, or stepper pontoons 3 arranged on each side of the vehicle.

Each half wheel is offset laterally from the other member of the pair and mounted at an opposite angular position to it on the same axle so that the pair makes up the profile of a complete wheel. The outer half wheels on each side are in longitudinal alignment and are maintained in the same angular phase by a connecting rod 4, and correspondingly the inner half wheels. There is a track beam 3 under each two outer or inner half wheels. Thus while the vehicle is rolling forward (for a distance of half a wheel circumference) on one set of outer, or inner, half wheels on a track beam the other set of opposed half wheels is out of contact with its track beam and allows it to be raised and moved forward for the vehicle to roll forward on it in turn.

The ground bearing track beams 3 are made hollow as illustrated to add to the buoyancy of the vehicle when it is used amphibiously, and also to make the tracks lighter and to prevent dirt weighing down on the tracks when the vehicle is used on soft ground.

One example of means of raising and moving the tracks 3 by means of cams, levers, rollers and gears is illustrated. Cams 5 raise rollers 6 on pairs of levers 7 which are pivotally mounted on the frame at 7a, and rollers 8 on the ends of the levers raise the track. At the same time, as shown in FIG. 6, a cam 9 raises a roller 10 on a right angled lever 11 with gear teeth which is pivotally mounted on the frame at 11a and turns gears 12, 12a, 12b, to rotate a wheel 13 to which one end of a cable 14 is attached whose other end is connected to the track and pulls it ahead, the sizes of the gears 12, 12a, 12b and the wheel 13 being proportioned so as to give the required travel of the track.

To absorb and store the energy of the momentum of the track, spring means 14a may be interposed at the end of the cable 14; also, a shock absorber or spring means 15 may be placed on the frame to engage a stop 16 on the track. These spring means may be adjustable to suit varying speeds. A spring may be attached to the quadrant 11 to prevent slack in the cable 14.

Preferably, the front end of the track 3 is raised sooner and lowered later than the rear end, to aid the track in surmounting obstacles and reduce its impact on the ground when lowered and also to allow the rear end to drag on the ground if the track overtravels. For this purpose the raising and lowering surfaces of the front cam 5 may be spaced further apart than those of the rear cam 5. The cams may be made adjustable for reversing the vehicle, or other means may be employed.

Vertical roller guides 17 are mounted on the frame 1 to maintain the tracks 3 in longitudinal alignment.

Gear or sprocket wheels 18 are illustrated for attaching a power drive from an engine mounted on the frame.

In order to prevent the half wheels slipping on the tracks when on an incline or turning, the contacting surfaces may be made rough or, as shown in FIGS. 3 and 4, a sprocket wheel 19 may be mounted beside the half wheel 2 to engage a rack 20 on the track, the rack being supported on springs 21 just strong enough to hold its weight. Additional springs may be placed at the ends of the rack to allow it slight longitudinal movement.

Preferably, as shown in FIG. 3, the wheel segments are made slightly greater than a semi-circle to allow sufficient area for full bearing of their ends when both of the pair of segments are in contact with their tracks at the same time, and also to allow for wear on the ends of the segments.

As shown in FIGS. 3 and 4, the rollers 22 are mounted on the wheel segments tangential to their circumferential ends. These allow for full bearing area at the ends of the half wheels, if segments just equal to a semi-circle are used, and also allow the end of the segment to roll on the track when the track is on rising ground.

Attachments may easily be fitted to the tracks by raising them successively, for example: wider treads, cleats, rubber or pneumatic treads; blocks or strips to increase the intensity of pressure for consolidating filled ground, also vibrators may be attached to the tracks for this purpose.

A blade grader or cow-catcher may be mounted on arms on the frame extending out in front of the vehicle to remove obstacles, and a sled or roller may be similarly mounted when traveling on snow to partially consolidate it so that the tracks do not sink so deep.

Intermediate pairs of half wheels may be placed between and in the same phase as those shown to spread the load on the track, where the vehicle is used mainly on even ground.

Holes for air or water jets may be formed in the bottom of the tracks to reduce suction in adhesive ground.

The following features of the vehicle will be evident:

It remains at a constant height above the average ground level.

The speed may be uniform.

It may be self driven or pulled as a trailer.

It may be turned by applying a drive to the half wheels on one side by means of clutches or separate engines.

Both tracks on each side may be placed on the ground when the vehicle is standing, to reduce the pressure on the ground.

Actuating parts and those subject to extra wear are not in contact with the ground and mud.

The vehicle may be raised or lowered vertically for, for example, cranes for skyscraper steel erection or dam building, by blocking under the tracks successively as it moves forward and backward.

For very large loads vehicles may be used in tandem or in fours.

Some uses for vehicles as described are: general transportation and, in particular, heavy loads over soft ground, snow or ice, jungle or swamp undergrowth; agricultural cultivation and harvesting; industrial, mining and logging; construction equipment of many kinds, for example, cranes, earth movers, graders, for moving houses, and so forth.

FIG. 6 shows a vehicle adapted for amphibious use with the hull 23 of a boat mounted on the middle of the frame between the pairs of half wheels on each side, suitable for beach landing craft, fishing boats, ships, submarines, and the like. The vehicle may be incorporated in the vessel or form a separate carriage into which the vessel is floated to take it ashore, or a pair of vehicles may be employed. The longitudinal axis of the vehicle may be inclined to that of the vessel for greater ease of landing on a sloping beach. The hollow tracks add to the buoyancy and lateral stability of the boat. The half wheels may be shrouded over for streamlining.

FIG. 7 shows another amphibious vehicle constructed to travel on the bottom under water with a platform 24 mounted above water level on the frame 1. The buoyancy can be controlled and the vehicle sunk to the required depth with water ballast. It can form a stable platform without the use of anchors or mooring lines and unaffected by current or normal wave action. Guy wires from the ends of the tracks to the platform may be attached for added stability when standing. It is suitable for under water construction of many kinds, for example, marine salvage, dredging, grading, pipelines, tunnels, oil drilling, docks and bridge piers and so forth. It may form a convenient means of testing the bearing value of ground, particularly under water.

Amphibious vehicles with their decks supported on columns above water and their tracks at considerable depths can be constructed as ships to take advantage of the greater speeds attainable and the greater stability when unaffected by wave action. They may also incorporate the hydrofoil principle. Deep docking facilities are not required as the vehicles can travel ashore up sloping beaches or ramps.

Amphibious vehicles with bulk cargoes can also travel ashore and unload by gravity.

Amphibious vehicles may be inclined at an angle when approaching a sloping beach by letting water into a rear compartment and allowing it to drain or be pumped out when the vehicle travels up the slope.

I claim:

1. A moving ground-engaging vehicle capable of operating under water on a river bed or the like or on dry ground, said vehicle of the type which successively lays and advances the track members on which it travels in progressive motion and comprising, a supporting frame, tandem pairs of substantially semi-circular wheel segments mounted for rotation on each side of said frame, pairs of hollow elongated buoyant pontoon track members underlying said tandem pairs of wheel segments on each side of the frame and adapted to be advanced longitudinally for moving the vehicle, the wheel segments of each pair disposed in side-by-side spaced relation and oppositely arranged circumferentially so that one wheel segment of each pair is rolling on a pontoon track member while the other wheel segment is out of engagement with its underlying pontoon track member, said buoyant pontoon track members having substantially vertical depth to maintain the wheel segments above the soft mud of a river bed or the like, movable means connected with the pairs of wheel segments and engaging said pontoon track members and operable upon rotation of the wheel segments to forwardly advance one of each pair of said pontoon track members, the second of each pair of pontoon track members then resting upon the ground and supporting said frame and being engaged by the wheel segments of said pairs rolling on it, sprocket wheel means connected with the wheel segments, and toothed racks resiliently mounted upon the said pontoon track members to permit free engagement with said sprocket wheel means and to prevent fracture of the teeth of the sprocket wheel means, and said resiliently mounted toothed racks positively engaging the sprocket wheel means to prevent slippage of the latter on the pontoon track members when the wheel segments are rolling on such members.

2. A stepper type vehicle for operation under water on a river bed or the like comprising, a supporting frame, tandem pairs of substantially semi-circular wheel segments mounted for rotation on each side of said frame with the wheel segments of each pair disposed in side-by-side spaced relation and oppositely arranged circumferentially so that one wheel segment of each pair is active while the other wheel segment is inactive, pairs of hollow elongated buoyant stepper pontoons having substantially vertical depth underlying said tandem pairs of wheel segments on each side of the frame and adapted to be elevated and shifted longitudinally for moving the vehicle with a stepping action, rotary cam and linkage means associated with the pairs of wheel segments and having lifting engagement with said stepper pontoons near the forward and rear ends of the latter and operable upon rotation of the wheel segments to lift one of each pair of stepper pontoons and advance it longitudinally, the second of each pair of stepper pontoons then resting upon the river bed and supporting said frame and being engaged by the active wheel segments of said pairs, resilient interengaging toothed means on the peripheries of the wheel segments and the tops of the said stepper pontoons to prevent slippage of the wheel segments on the pontoons when the wheel segments are actively engaging the stepper pontoons.

3. A stepper type vehicle for operation under water on a river bed or the like comprising, a supporting frame, tandem pairs of substantially semi-circular wheel segments journaled for rotation on each side of said frame with the wheel segments of each pair disposed in side-by-side spaced relation and oppositely arranged circumferentially so that one wheel segment of each pair is active in advancing the supporting frame while the other wheel segment is inactive, pairs of hollow elongated buoyant stepper pontoons underlying said tandem pairs of wheel segments on each side of the frame and adapted to be elevated and shifted longitudinally for moving the vehicle with a stepping action, said stepper pontoons being substantially T-shaped in cross section providing lifting flanges, rotary cam means connected with the pairs of wheel segments, linkage arms pivoted to said frame adjacent said rotary cam means and carrying roller members for lifting engagement beneath the flanges of said stepper pontoons near the forward and rear ends thereof, said linkage arms being pivoted by sam cam means upon rotation of the wheel segments to the inactive position to lift one of each pair of stepper pontoons, the second of each pair of stepper pontoons then resting upon the river bed and supporting said frame and being engaged by the active wheel segments of said pairs of wheel segments, and linkage means operable by said rotary cam means for longitudinally advancing the raised stepper pontoon of each pair.

4. A stepper type vehicle for operation under water on a river bed or the like as set forth in claim 3, in which said linkage means comprises a pair of toothed lever members pivotally mounted on said frame for each stopper pontoon adjacent said rotary cam means and disposed for engagement therewith, rotary cable drums journaled on said frame and connected for rotational movement upon pivotal movement of said toothed lever members, said rotary cable drums carrying advancing cables attached to opposite ends of the associated stepper pontoon, and said toothed lever members being operable by said rotary cam means for imparting rotary motion to said cable drums to operate said cables for longitudinally advancing the raised stepper pontoon upon rotation of the wheel segments.

5. A stepper type vehicle as set forth in claim 3 in which said rotary cam means comprise cam members for imparting pivotal lifting motion to said linkage arms, and separate cam members for imparting pontoon advancing motion to said linkage means.

References Cited in the file of this patent

UNITED STATES PATENTS

| | | |
|---|---|---|
| 1,155,975 | Van Antwerp | Oct. 5, 1915 |
| 1,287,086 | Olsen | Dec. 10, 1918 |
| 1,289,589 | Wilson | Dec. 31, 1918 |
| 1,627,984 | Martinson | May 10, 1927 |
| 1,692,121 | Holmes | Nov. 20, 1928 |
| 2,430,537 | Snell | Nov. 11, 1947 |

FOREIGN PATENTS

| | | |
|---|---|---|
| 94,819 | Austria | Nov. 10, 1923 |
| 311,096 | Germany | Feb. 25, 1919 |